US011093878B2

(12) United States Patent
De et al.

(10) Patent No.: US 11,093,878 B2
(45) Date of Patent: Aug. 17, 2021

(54) SYSTEM AND METHOD FOR PROVIDING TEMPORAL DEPENDENCIES BETWEEN TASKS

(71) Applicant: ORACLE INTERNATIONAL CORPORATION, Redwood Shores, CA (US)

(72) Inventors: Niladri Sekhar De, Telangana (IN); John S. John, Kerala (IN)

(73) Assignee: Oracle International Corporation, Redwood Shores (CA)

( * ) Notice: Subject to any disclaimer, the term of this patent is extended or adjusted under 35 U.S.C. 154(b) by 924 days.

(21) Appl. No.: 14/788,834

(22) Filed: Jul. 1, 2015

(65) Prior Publication Data

US 2017/0004431 A1     Jan. 5, 2017

(51) Int. Cl.
*G06Q 10/06*     (2012.01)
*G06Q 10/10*     (2012.01)

(52) U.S. Cl.
CPC ..... *G06Q 10/06316* (2013.01); *G06Q 10/103* (2013.01)

(58) Field of Classification Search
None
See application file for complete search history.

(56) References Cited

U.S. PATENT DOCUMENTS

| 7,346,531 | B2 * | 3/2008 | Jacobs | G06Q 10/02 |
| | | | | 705/7.15 |
| 8,166,479 | B2 * | 4/2012 | Roberts | G06F 9/526 |
| | | | | 718/100 |
| 8,387,066 | B1 | 2/2013 | Becher et al. | |
| 8,400,467 | B1 * | 3/2013 | Ponce de Leon | G06Q 10/06316 |
| | | | | 345/619 |

(Continued)

OTHER PUBLICATIONS

Tinggui Chen, Renbin Xiao, "A Dynamic Intelligent Decision Approach to Dependency Modeling of Project Tasks in Complex Engineering System Optimization", Mathematical Problems in Engineering, vol. 2013, Article ID 398123, 12 pages, 2013 (Year: 2013).*

(Continued)

*Primary Examiner* — Timothy Padot
*Assistant Examiner* — Darlene Garcia-Guerra
(74) *Attorney, Agent, or Firm* — Kraguljac Law Group, LLC

(57) ABSTRACT

Systems, methods, and other embodiments are disclosed that are configured to generate and temporally associate task structures in a computerized project plan representing tasks of a project. In one embodiment, a temporally dependent relationship is formed between a successor task structure and a group of predecessor task structures within the computerized project plan, in response to user interaction with a graphical user interface associated with the computerized project plan. The temporally dependent relationship is (Continued)

formed by allowing a temporal event associated with the successor task structure to be recorded within the computerized project plan as having occurred only after a temporal criterion is recorded within the computerized project plan as having been met for a defined number of predecessor task structures in the group. The defined number is less than a total number of predecessor task structures in the group.

17 Claims, 9 Drawing Sheets

(56) References Cited

U.S. PATENT DOCUMENTS

| | | | | |
|---|---|---|---|---|
| 8,620,703 | B1* | 12/2013 | Kapoor | G06Q 10/06311 705/7.11 |
| 8,689,231 | B2 | 4/2014 | Milnor | |
| 9,409,294 | B1* | 8/2016 | Shapiro | B25J 9/1664 |
| 2002/0188597 | A1* | 12/2002 | Kern | G06Q 30/06 |
| 2003/0105597 | A1* | 6/2003 | Tsui | G06N 3/0454 702/20 |
| 2005/0066330 | A1* | 3/2005 | Kanai | G06F 1/3203 718/102 |
| 2006/0004618 | A1* | 1/2006 | Brixius | G06Q 10/06 705/7.18 |
| 2008/0033777 | A1* | 2/2008 | Shukoor | G06Q 10/0639 705/7.11 |
| 2008/0066072 | A1* | 3/2008 | Yurekli | G06Q 10/06 718/104 |
| 2008/0103871 | A1* | 5/2008 | Ruehl | G06Q 10/06 705/7.15 |
| 2009/0204463 | A1* | 8/2009 | Burnett | G06Q 10/0633 705/7.12 |
| 2009/0327403 | A1* | 12/2009 | Bhat | G06F 9/4443 709/203 |
| 2010/0070315 | A1* | 3/2010 | Lu | G06Q 10/06 705/7.22 |
| 2011/0145037 | A1* | 6/2011 | Domashchenko | G06Q 10/06 705/7.27 |
| 2011/0231759 | A1* | 9/2011 | Shimada | G06F 9/453 715/709 |
| 2012/0036462 | A1 | 2/2012 | Schwartz et al. | |
| 2012/0215574 | A1* | 8/2012 | Driessnack | G06Q 10/0639 705/7.12 |
| 2013/0074063 | A1* | 3/2013 | Schwartz | G06Q 10/06311 717/174 |
| 2013/0151421 | A1* | 6/2013 | Van Der Ploeg | G06Q 10/06 705/301 |
| 2013/0197958 | A1* | 8/2013 | Kawecki | G06Q 10/0633 705/7.15 |
| 2014/0101673 | A1 | 4/2014 | Klyuchevskyy et al. | |
| 2014/0229221 | A1* | 8/2014 | Shih | G06F 9/5061 705/7.23 |
| 2014/0244334 | A1* | 8/2014 | De | G06Q 10/063118 705/7.17 |
| 2014/0317629 | A1* | 10/2014 | Stanfill | G06F 9/4843 718/102 |
| 2014/0325423 | A1 | 10/2014 | Mohammad et al. | |
| 2014/0343999 | A1* | 11/2014 | Kim | G06Q 10/06313 705/7.23 |
| 2015/0006232 | A1* | 1/2015 | Anaby-Tavor | G06Q 10/06316 705/7.26 |
| 2015/0081873 | A1* | 3/2015 | Stein | G06Q 10/067 709/223 |
| 2016/0132817 | A1* | 5/2016 | Kongot | G06Q 10/063114 705/7.15 |

OTHER PUBLICATIONS

CA WA Workstation ESP Edition Using Applications; Downloaded from: https://supportcontent.ca.com/cadocs/0/CA%20Workload%20Automation%20ESP%20Edition%2011%204%20-%20PUBLIC%20BOOKS%20ONLY-ENU/Bookshelf_Files/HTML/UserGuide/index.htm?toc.htm?461451.html; copyright 2013; pp. 1-91.

Project Task Relationships and Dependencies; Downloaded from: http://wiki.servicenow.com/index.php?title=Project_Task_Relationships_and_Dependencies; downloaded Feb. 13, 2015; pp. 1-7.

Andy Jessop, Changing Task Dependencies, downloaded from: http://www.projectlearning.net/pdf/E2_1.pdf; downloaded Feb. 13, 2015; pp. 1-9; Project Learning International Limited; New Zealand.

* cited by examiner

700

DEPENDENCY GROUP MAPPING TABLE

| Group 1 ID | P1 ID | S1 ID |
| Group 1 ID | P4 ID | S1 ID |
| Group 2 ID | P2 ID | S1 ID |
| Group 2 ID | P3 ID | S1 ID |
| Group 2 ID | P5 ID | S1 ID |

FIG. 7

SYSTEM AND METHOD FOR PROVIDING TEMPORAL DEPENDENCIES BETWEEN TASKS

BACKGROUND

In the field of project planning, a project manager can establish a project plan for a project by defining tasks and groups of tasks. Furthermore, the project manager can set up or define simple "hard' dependencies between tasks within the project plan. For example, one task may depend on another task such that the one task may not be allowed to start until the other task is completed. As another example, one task may depend on another task such that the one task may not be allowed to finish until the other task finishes. In some scenarios, where a second task depends on a first task, the first task may suffer from an inherent risk that it may not be completed on time, if at all. This is particularly true for research or exploration types of tasks. In such a scenario, the project manager may arrange for multiple groups of resources to pursue that same first task in parallel, in the hope that at least one of the groups will successfully complete the first task.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 7 illustrates one embodiment of a data structure within a computerized project plan that associates two groups of predecessor task structures with a successor task structure in a temporally dependent manner;

DETAILED DESCRIPTION

Figure 1:
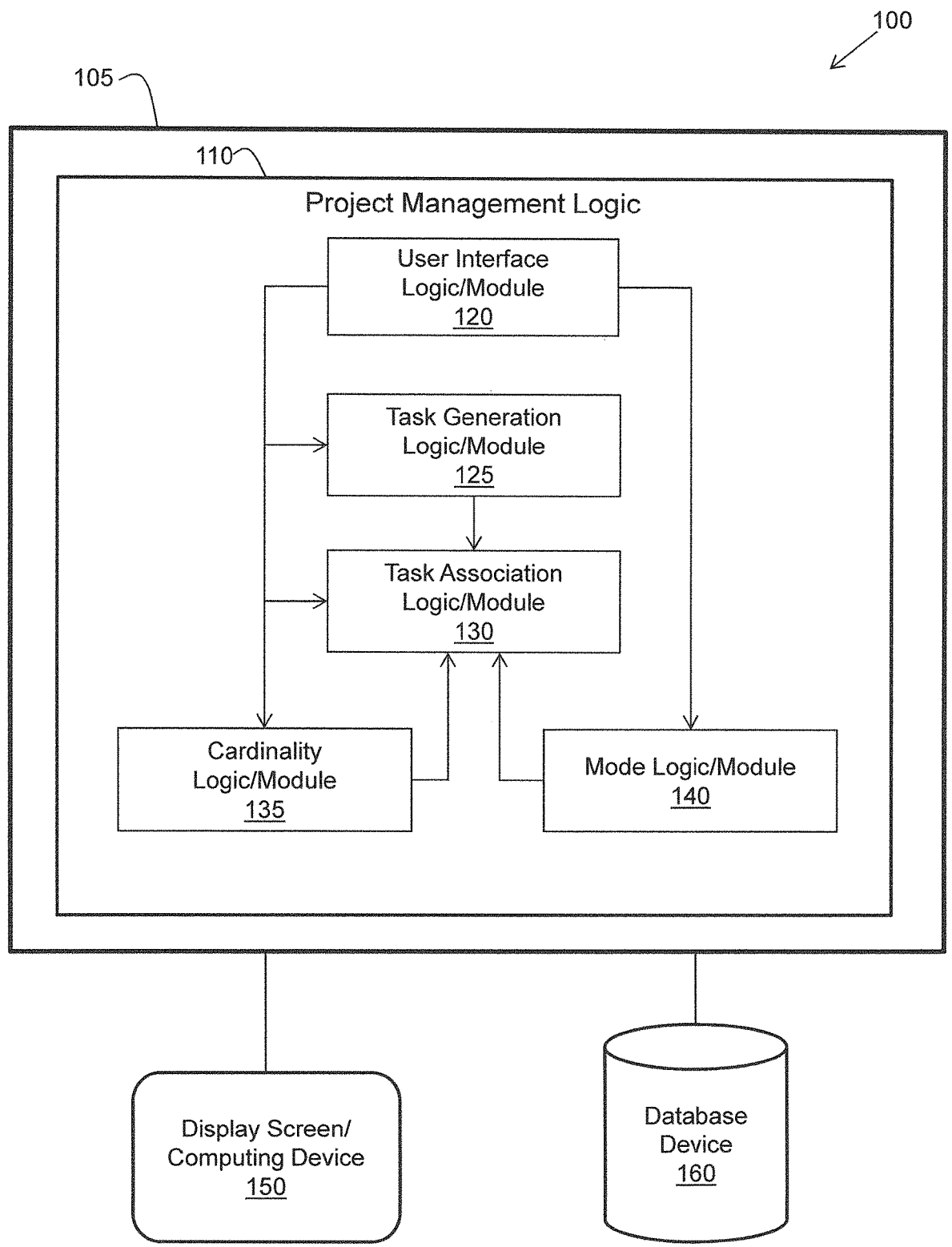
FIG. 1 illustrates one embodiment of a computer system, having a computing device configured with a project management logic.

Systems, methods, and other embodiments are disclosed for establishing either-or dependencies between predecessor tasks and successor tasks within a computerized (electronic) project plan. In the field of project planning, a project plan may be electronically implemented in a computerized project planning application. A project manager can define tasks associated with a project within the electronic project plan with respect to various times (e.g., dates). Task structures are generated, within a computerized project plan, which represent actual tasks of a project to be performed in the real world.

For example, a set of predecessor task structures may be generated along with a successor task structure within a computerized project plan. A successor task is a task that is somehow dependent on one or more predecessor tasks. One type of dependency is an "either-or" dependency. An "either-or" dependency can be established between the predecessor task structures and the successor task structure. Such an either-or dependency provides representations of dynamic, alternative dependencies between tasks. The concept of either-or dependency is explained and elaborated upon herein in various places.

For example, suppose there are five (5) predecessor task structures and one (1) successor task structure defined in a computerized project plan. An either-or dependency may be established, between the task structures within the computerized project plan, which represents a real world condition. For example, the real world condition may be the fact that a successor task is not allowed to start until any three (3) of the five (5) predecessor tasks have been completed. Such a dependent relationship is known herein as an "either-or" dependency and is dynamic in the sense that it does not matter which three (3) predecessor tasks are completed before the successor task can start.

Embodiments of the present systems and methods allow such either-or dependencies to be set up and established within a computerized project plan. For example, with respect to the example discussed above, a project manager can be prevented from designating, within the computerized project plan, that the successor task has started. The either-or dependency relieves the project manager from designating the successor task as having started until at least any three (3) of the predecessor tasks have been designated as being completed. In this manner, either-or dependencies can be established and adhered to within a computerized project plan.

Either-or dependencies can be used for risk mitigation in project management associated with high value, very critical, and/or risky projects. When time or perfection of a deliverable is a primary constraint instead of cost, making use of either-or dependencies, and alternate parallel predecessor tasks, can prove to be a superior approach to conventional methods. The concept of either-or dependency can provide project management solutions to several industries including, for example, outsourcing, defense research, and space exploration. Embodiments provide project managers a concise way to represent such scenarios and create a better project plan.

The following terms are used herein with respect to various embodiments.

The term "task structure" as used herein, refers to a data structure defined within a computerized project plan which represents a task to be completed for a project, for example, in the real world. In particular, a successor task is a task that is dependent on one or more predecessor tasks based on one or more dependent conditions.

The term "temporally dependent relationship", as used herein, refers to a time-constrained connection between at least one predecessor task and a successor task. Such a temporally dependent relationship may be represented within a computerized project plan by at least one predecessor task structure, a successor task structure, and data (and/or a data structure) tying the predecessor task structure to the successor task structure in a particularly defined manner.

The term "temporal event", as used herein, refers to an action that has occurred or may occur in time with respect to a successor task. For example, a temporal event may correspond to the starting of a successor task, or to the finishing of a successor task. In accordance with one embodiment, a temporal event may be defined within a computerized project plan as part of a successor task structure of the project plan.

The term "temporal criterion", as used herein, refers to a condition that is to be met in time with respect to a predecessor task before a temporal event of a successor task is allowed to occur. For example, a temporal criterion may correspond to the condition that a predecessor task has begun, or to the condition that a predecessor task has completed. In accordance with one embodiment, a temporal criterion may be defined within a computerized project plan as part of a predecessor task structure of the project plan.

The term "either-or dependency", as used herein, refers to a particular type of temporally dependent relationship. A computerized project plan may have any number of task structures defined. Each task structure is defined to, for example, monitor and/or track a real world task being performed. For example, suppose there are four (4) task structures defined for real world tasks A, B, C, and D, respectively. An either-or dependency may be established between the task structures where the dependency represents a real world condition. For example, the real world condition may be such that task D is not allowed to start until any one (1) of the three tasks A, B, or C has completed. Thus, tasks A, B, and C are referred to as "predecessor" tasks because the defined dependency requires at least one of them to precede task D. Task D is thus a "successor" task because task D succeeds the other tasks. Since the dependency is "either-or," it does not matter which predecessor task is completed. The associated task structures in the project plan are used to record and track the status of their respective task. As long as one of the predecessor tasks completes, the completion satisfies the either-or condition and allows the successor task D to start. Such a temporally dependent relationship is known herein as an either-or dependency.

FIG. 1 illustrates one embodiment of a computer system 100, having a computing device 105 configured with project management logic 110. The project management logic 110 is configured to computerize the process of establishing temporally dependent relationships between predecessor task structures and successor task structures within a computerized project plan. Such temporally dependent relationships may include, for example, finish-to-start dependencies, finish-to-finish dependencies, start-to-start dependencies, and start-to-finish dependencies, as discussed in more detail later herein.

For example, in one embodiment, the project management logic 110 is configured to establish an either-or dependency (a particular type of temporally dependent relationship) between a group of predecessor task structures and a successor task structure within a computerized project plan. When a group of predecessor task structures is referred to herein, it is taken to mean that the group includes two or more (i.e., a plurality) of predecessor task structures.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

The embodiments described herein allow the generating and relating of tasks of a project in a computerized manner. User interface logic provides a graphical user interface with which a user (e.g., a project manager) may interact to generate predecessor task structures and associated successor task structures within a computerized project plan and form either-or dependent relationships between the task structures.

In one embodiment, a computer algorithm is disclosed that implements a computerized approach to relating task structures in an either-or manner within a computerized project plan. It is assumed herein that the task structures represent real tasks of a real project that is being executed (or is about to be executed) in the real world.

With reference to FIG. 1, in one embodiment, the project management logic 110 is implemented on the computing device 105 and includes logics for implementing various functional aspects of the project management logic 110. In one embodiment, the project management logic 110 includes user interface logic 120 (e.g., a user interface module), task generation logic 125 (e.g., a task generation module), task association logic 130 (e.g., a task association module), cardinality logic 135 (e.g., a cardinality module), and mode logic 140 (e.g., a mode module).

The computer system 100 also includes a display screen 150 operably connected via an operable connection to the computing device 105. In accordance with one embodiment, the display screen 150 is implemented to display views of and facilitate user interaction with a graphical user interface (GUI) (e.g., for viewing and updating information associated with generating and establishing relationships between task structures within a computerized project plan). The graphical user interface may be associated with a program management application and the user interface logic 120 may be configured to generate the graphical user interface, in accordance with one embodiment.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 150 may represent multiple computing devices/terminals that allow users to access and receive services from the project management logic 110 via networked computer communications.

In one embodiment, the computer system 100 further includes at least one database device 160 operably connected to the computing device 105 and/or a network interface to access the database device 160 via an operable connection. For example, in one embodiment, the database device 160 is operably connected via a network connection to the user interface logic 120. In accordance with one embodiment, the database device 160 is configured to store and manage data structures (e.g., files or records associated with computerized project plans) associated with the project management logic 110 in a database system (e.g., a program management system).

Other embodiments may provide different logics or combinations of logics that provide the same or similar functionality as the project management logic 110 of FIG. 1. In one embodiment, the project management logic 110 is an executable application including algorithms and/or program modules configured to perform the functions of the logics. The application is stored in a non-transitory computer storage medium. That is, in one embodiment, the logics of the project management logic 110 are implemented as modules of computer-executable instructions stored on a computer-readable medium.

Referring back to the logics of the project management logic 110 of FIG. 1, in one embodiment, the user interface logic 120 is configured to generate a graphical user interface (GUI) to facilitate user interaction with the project management logic 110. For example, the user interface logic 120 includes program code that generates and causes the graphical user interface to be displayed based on an implemented graphical design of the interface. In response to user actions and selections via the GUI, associated aspects of manipulating an electronic project plan may be performed. For example, a user may employ the GUI to generate task structures representing real-world tasks, and relate the task structures to each other in a temporally dependent manner (e.g., in a Gantt chart format).

For example, in one embodiment, the user interface logic 120 is configured to facilitate receiving inputs and reading data in response to user actions. For example, the user interface logic 120 may facilitate selection, reading, and inputting of an electronic file for a project plan. A project plan may reside in at least one data structure (e.g., within database device 160) associated with (and accessible by) a project management application (e.g., the project management logic 110) via the graphical user interface.

Furthermore, the user interface logic 120 is configured to facilitate the outputting and displaying of a computerized project plan via the graphical user interface on the display screen 150. Task structures and their dependent relationships to each other may be output and displayed as part of the computerized project plan (e.g., as a modified Gantt chart).

In one embodiment, task generation logic 125 is configured to generate a successor task structure and one or more groups of predecessor task structures within a computerized project plan in response to user interaction with a graphical user interface. The successor task structure represents a successor task of a project. Each task structure of the groups of predecessor task structures represents a predecessor task of the project. A group of predecessor task structures is made up of a plurality of predecessor task structures.

In accordance with one embodiment, a task structure is a data structure having data that define various attributes of an associated task. Attributes may include, for example, a start date associated with the task, a finish date associated with the task, and various other attributes representing, for example, progress made with respect to the task. The various task structures may be generated and displayed in a Gantt chart format, in accordance with one embodiment. Thus a task structure in a project plan is used to record and track the status of their respective task. Data representing the status of the task may be received from external devices that are configured to report such data and/or the data may be inputted into the present system by a user.

In one embodiment, task association logic 130 is configured to form a temporally dependent relationship (e.g., an either-or dependent relationship) between a successor task structure and a group of predecessor task structures within a computerized project plan in response to user interaction with a graphical user interface. The either-or dependent relationship (i.e., the either-or dependency) allows a temporal event associated with the successor task structure to be recorded within the computerized project plan as having occurred only after a temporal criterion is recorded within the project plan as having been met for a defined number of predecessor task structures in the group of predecessor task structures. Furthermore, the defined number has to be less than a total number of predecessor task structures in the group for the temporally dependent relationship to be considered an either-or dependency. It does not matter which predecessor task structures in the group meet the temporal criterion, as long as the defined number of predecessor task structures meet the temporal criterion.

The defined number is known herein as the cardinality of the either-or dependency. For example, a group of five (5) predecessor task structures may have a cardinality of three (3) as defined in a computerized project plan. Therefore, a temporal criterion has to be met and recorded for any three (3) out of the five (5) predecessor task structures in the group before a temporal event associated with the successor task structure can be designated and recorded as having occurred within a computerized project plan.

For example, the temporal event may be the start of the successor task and the temporal criteria may be the completion of a defined number of predecessor tasks within a group. Therefore, in accordance with the defined either-or dependency, the successor task is not allowed to start until the defined number (cardinality) of predecessor tasks in the group has been completed. The either-or dependency is represented within a computerized project plan as data structures of tasks (task structures) and data structures of association data. For example, in one embodiment, task association logic 130 is configured to form a temporally dependent relationship by mapping first data associated with a successor task structure to second data associated with a group of predecessor task structures. Such data structures are elaborated upon later herein with respect to, for example, FIG. 7 and FIG. 8.

The fact that a temporal criterion has been met for a predecessor task can be entered by a user (e.g., a project manager) into the computerized project plan via a graphical user interface and recorded in a data structure associated with the computerized project plan, in accordance with one embodiment. Furthermore, an indication of the recording of the occurrence of the temporal criteria may be presented in a displayed presentation of the computerized project plan to a user (e.g., a project manager). For example, the color of a representation (e.g., a rectangle) of a predecessor task may change from gray to white in response to a user recording that the temporal criterion has been met.

Similarly, when the defined number of predecessor tasks in a group have been recorded as being completed (and the associated colors have changed from gray to white), the color of a representation (e.g., a rectangle) of an associated successor task (in an either-or relationship with the group) may change from gray to green. The green color indicates that the temporal event associated with the successor task (e.g., the starting of the successor task) is allowed to proceed. The project manager may then give the go-ahead in the real world to proceed with the temporal event of the successor task.

Once the temporal event has actually occurred in the real world, the user may enter this fact into the computerized project plan, via the graphical user interface, where the occurrence of the temporal event is recorded in a data structure associated with the computerized project plan. When the user enters the fact that the temporal event has indeed occurred (e.g., that the successor task has actually started in the real world), another indication may be provided to the user in the displayed presentation of the computerized project plan to indicate the actual occurrence of the temporal event. For example, a triangular indicium may be displayed at a starting edge of the representation of the successor task structure to indicate that the associated task has indeed started.

In accordance with one embodiment, a single successor task may have an either-or dependent relationship with more than one group of predecessor tasks. For example, a first group may include three predecessor tasks and a second group may include two predecessor tasks. In accordance with a first either-or dependency, any two of the three predecessor tasks in the first group have to be completed before the successor task is allowed to start. Furthermore, in accordance with a second either-or dependency, any one of the two predecessor tasks in the second group have to be completed before the successor task is allowed to start.

In one embodiment, task association logic 130 is configured to change the temporally dependent relationship between a group of predecessor task structures and a successor task structure within a computerized project plan. For example, in one embodiment, a project manager may interact with a graphical user interface to allow a temporal event of the successor task structure to be recorded within a computerized project plan as having occurred only after a temporal criteria is recorded within the computerized project plan as having been met for each predecessor task structure in the group of predecessor task structures. Such a modified temporally dependent relationship is no longer an either-or dependency but may, instead, be characterized as an absolute or global dependency since the temporal criterion has to be met for all of the predecessor tasks in the group.

In one embodiment, cardinality logic 135 is configured to change the defined number of the plurality of predecessor task structures, in response to user interaction with a graphical user interface, and communicate the defined number to the task association module 130. For example, an initial default or user-specified defined number (the cardinality) may be one (1), indicating that a temporal criterion has to be met and recorded for any one (1) out of three (3) predecessor task structures before a temporal event of a successor task structure can be designated and recorded as having occurred within a computerized project plan. Cardinality logic 135 may then change the defined number (the cardinality) to two (2), in response to a project manager's interaction with the graphical user interface. As a result, the temporal criteria now has to be met and recorded for any two (2) out of the three (3) predecessor task structures before the temporal event of the successor task structure can be designated and recorded as having occurred within the computerized project plan.

In one embodiment, mode logic 140 is configured to indicate to task association logic 130 that work is to be stopped for at least one uncompleted predecessor task when the temporal criteria for the defined number of predecessor task structures in the group is recorded as being met within task association logic 130. For example, if the group of predecessor task structures includes four (4) predecessor task structures and the cardinality is one (1), there may be no good reason to continue with the remaining three (3) uncompleted predecessor tasks once an initial one (1) of the predecessor tasks is completed. Therefore, cost and other resources such as labor can be saved.

For example, the group of four (4) predecessor task structures may each be associated with the successor task of successfully making a cryogenic engine for a spaceship. The successor task may be that of integrating the cryogenic engine into the spaceship. Four (4) separate teams, each associated with one of the predecessor task structures, may be working on making a cryogenic engine. However, once one team associated with a predecessor task structure successfully completes a cryogenic engine, that cryogenic engine may be integrated into the spaceship, and there is no need for the other three teams to continue work to complete their cryogenic engines. In one embodiment, the color of the representations (e.g., rectangles) of the uncompleted predecessor task structures may be automatically changed to black, indicating that work on the associated predecessor tasks is to be stopped.

In this manner, a project manager can set up an either-or dependency between a group of predecessor tasks and a successor task in a computerized project plan. The either-or dependency will not allow a temporal event of the successor task to be designated and recorded as having occurred until a temporal criterion defined for the group of predecessor tasks is recorded as being met. As a result, a project manager can readily track which successor tasks may or may not be started (or finished) based on whether or not a defined number of predecessor tasks have begun (or completed). Thus, the ability to establish such either-or dependencies, and associated functionality, in a computerized project plan constitute an improvement to the technical field of computerized project management.

Figure 2A:
FIGS. 2A-2D illustrate diagrams showing four different types of temporally dependent relationships between a predecessor task and a successor task.

FIGS. 2A-2D illustrate diagrams showing four different types of temporally dependent relationships between a predecessor task and a successor task. The temporally dependent relationship shown in FIG. 2A is a finish-to-start dependency. In such a finish-to-start dependency, a successor task (as represented in FIG. 2A by rectangle S) cannot start until a predecessor task (as represented in FIG. 2A by rectangle P) has completed. As such, in the temporally dependent relationship shown in FIG. 2A, the temporal event is the starting of the successor task, and the temporal criterion that has to be met is the completion of the predecessor task. The right edge of rectangle P represents the completion point in time of the predecessor task. The left edge of rectangle S represents the starting point in time of the successor task. The dashed part of rectangle S indicates that the successor task can start much later without violating the dependency condition.

For any of FIGS. 2A-2D, a successor task may be represented within a computerized project plan as a successor task structure (a data structure) and the predecessor task may be represented within the computerized project plan as a predecessor task structure (a data structure). Both task structures may include attribute data defining, for example, the start and finish of the associated task. Other types of attribute data are possible as well, in accordance with various other embodiments.

Figure 2B:
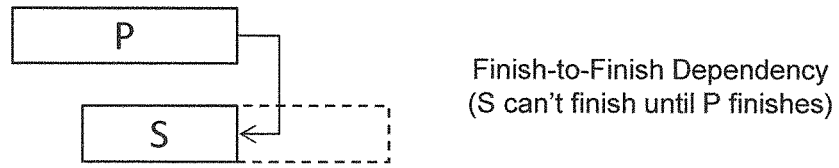

The temporally dependent relationship shown in FIG. 2B is a finish-to-finish dependency. In such a finish-to-finish dependency, a successor task (as represented in FIG. 2B by rectangle S) cannot finish until a predecessor task (as represented in FIG. 2B by rectangle P) has completed. As such, in the temporally dependent relationship shown in FIG. 2B, the temporal event is the finishing of the successor task, and the temporal criterion that has to be met is the completion of the predecessor task. The right edge of rectangle P represents the completion point in time of the predecessor task. The right edge of rectangle S represents the finishing point in time of the successor task. The dashed part of rectangle S in FIG. 2B indicates that the successor task may actually finish well after the predecessor task has finished, without violating the temporal criterion.

Figure 2C:

The temporally dependent relationship shown in FIG. 2C is a start-to-start dependency. In such a start-to-start dependency, a successor task (as represented in FIG. 2C by rectangle S) cannot start until a predecessor task (as represented in FIG. 2C by rectangle P) has begun. As such, in the temporally dependent relationship shown in FIG. 2C, the temporal event is the starting of the successor task, and the temporal criterion that has to be met is the beginning of the predecessor task. The left edge of rectangle P represents the beginning point in time of the predecessor task. The left edge of rectangle S represents the starting point in time of the successor task. The dashed part of rectangle S in FIG. 2C indicates that the successor task may start well after P has started without violating the temporal criterion.

Figure 2D:
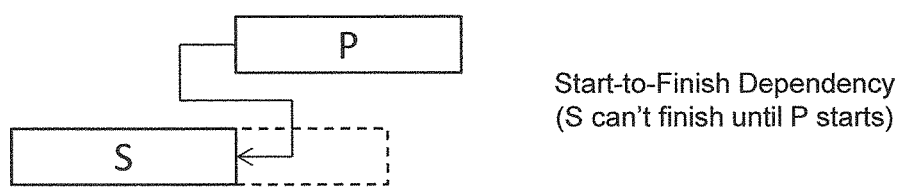

The temporally dependent relationship shown in FIG. 2D is a start-to-finish dependency. In such a start-to-finish dependency, a successor task (as represented in FIG. 2D by rectangle S) cannot finish until a predecessor task (as represented in FIG. 2D by rectangle P) has begun. As such, in the temporally dependent relationship shown in FIG. 2D, the temporal event is the finishing of the successor task, and the temporal criterion that has to be met is the beginning of the predecessor task. The left edge of rectangle P represents the beginning point in time of the predecessor task. The right edge of rectangle S represents the finishing point in time of the successor task. The dashed part of the rectangle S indicates that S can actually finish well after P has started without violating the temporal criterion.

Any of the temporally dependent relationships shown in FIGS. 2A-2D may be extended to the either-or dependency concept described herein. However, the examples shown in FIGS. 4-6, discussed later herein, are based on a finish-to-start dependency between groups of predecessor tasks and a successor task.

Figure 3:
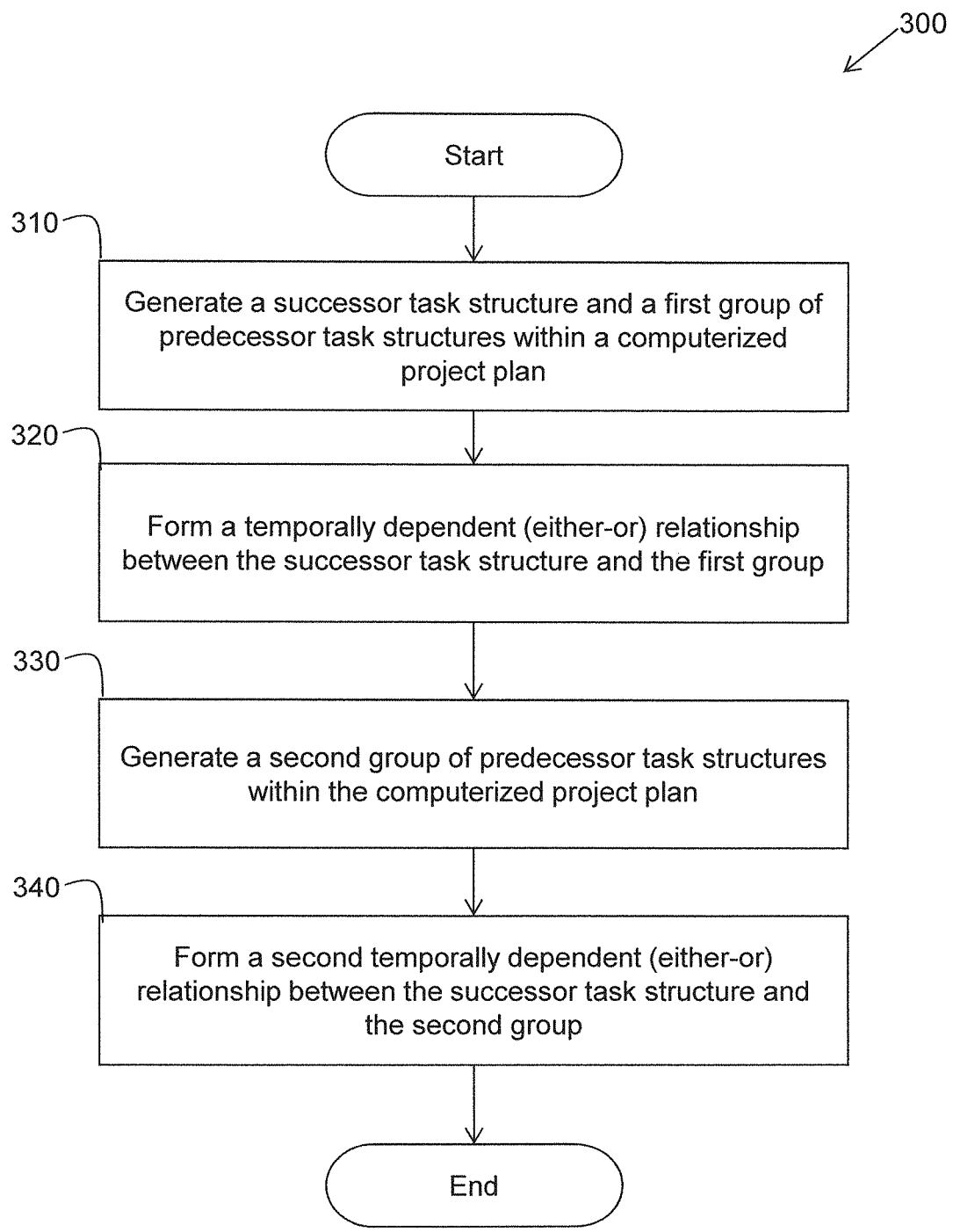
FIG. 3 illustrates one embodiment of a method, which can be performed by the project management logic of the computer system of FIG. 1, to form temporally dependent relationships between predecessor tasks and successor tasks in a computerized project plan.

FIG. 3 illustrates one embodiment of a method 300, which can be performed by the project management logic 110 of the computer system 100 of FIG. 1, to form temporally dependent relationships between predecessor tasks and successor tasks in a computerized project plan. Method 300 may be implemented by a computing device configured with algorithms that perform the method 300. For example, in one embodiment, method 300 is implemented by a computing device configured to execute a computer application. The computer application is configured to process data in electronic form and includes stored executable instructions that perform the functions of the method 300.

The method 300 will be described from the perspective that a project plan is made up of representations of tasks (e.g., task structures) that can be associated with each other to form dependent relationships. In one embodiment, the project management logic 110 is configured to generate and establish relationships between groups of representations of predecessor tasks and individual successor tasks. The assumption is that, when a criterion is met for each of a defined number of predecessor tasks in a group (e.g., for 3 out of 5 in the group), an event for a related successor task may occur. However, if the event of the successor task is dependent on two or more groups of predecessor tasks, a criterion (e.g., m out of n) for each group will have to be met before the event may occur. Furthermore, the criterion may be different for each group (e.g., 1 out of 2 for group A; 2 out of 3 for group B; 1 out of 3 for group C).

Upon initiating method 300, at block 310, a successor task structure and a first group of predecessor task structures are generated within a computerized project plan. The successor task structure represents a successor task of a project. Each predecessor task structure in the first group represents a predecessor task of the project. In one embodiment, block 310 is performed by task generation logic 125 of the project management logic 110 in response to user interaction with a graphical user interface provided by user interface logic 120. As an example scenario, each predecessor task may correspond to a different engineering team working on developing the same cryogenic engine for a spaceship. The successor task may correspond to integrating one of the cryogenic engines, from one of the engineering teams (e.g., the first engineering team to successfully develop the cryogenic engine), into the spaceship.

At block 320, in response to user interaction with a graphical user interface associated with the computerized project plan, a first temporally dependent relationship is formed between the successor task structure and the first group within the computerized project plan. In one embodiment, the first temporally dependent relationship is formed in response to at least one drag and drop operation performed in response to user interaction with the graphical user interface. The first temporally dependent relationship may be formed via at least one data structure within the computerized project plan. Example embodiments of such data structures are discussed later herein with respect to FIG. 7 and FIG. 8. For example, in one embodiment, a data structure may be used to form the first temporally dependent relationship by mapping first data associated with the successor task structure to second data associated with the first group within the computerized project plan.

The nature of the first temporally dependent relationship is such that a temporal event associated with the successor task structure is allowed to be recorded as having occurred within the computerized project plan only after first temporal criteria is recorded as having been met within the computerized project plan. The temporal event may be, for example, starting the successor task or finishing the successor task. The first temporal criteria may be, for example, beginning predecessor tasks of the first group or completing predecessor tasks of the first group.

The first temporal criteria have to be recorded as being met for a first defined number of predecessor task structures in the first group before the temporal event can be recorded as having occurred. Furthermore, for the first temporally dependent relationship to be an either-or dependency, the first defined number has to be less than a first total number of predecessor task structures in the first group. For example, the number of predecessor tasks associated with the first group may be three (3) and the first defined number may be one (1). That is, with respect to the example scenario, only one of three engineering teams has to successfully develop the engine before integration of the engine into the spaceship can begin.

A successor task structure (or at least certain data fields of the successor task structure) may initially be held in a "locked" state by task association logic 130 such that the successor task structure (or the certain data fields) cannot be edited by a user. In accordance with one embodiment, forming a temporally dependent relationship configures a computerized project plan for detecting an attempt to modify (change) a status of a temporal event associated with a successor task structure. For example, the attempt may be to try to change the status of the successor task structure from "successor task not started" to "successor task started", or from "successor task not finished" to "successor task finished". The attempt may be detected by the computerized project plan when a user clicks on (e.g., using a computer mouse) a displayed icon representing the successor task structure to select the successor task. In accordance with one embodiment, upon selecting the successor task, user interface logic 120 is configured to send a detection signal (or message) to task association logic 130 indicating that the attempt has been made.

Furthermore, forming the temporally dependent relationship configures the computerized project plan for checking whether a temporal criterion is recorded within the computerized project plan as being met for a defined number of predecessor task structures in a group of predecessor task structures, in response to the detecting. Again, the defined number is less than a total number of predecessor task structures in the group. For example, in response to receiving the detection signal from user interface logic 120, task association logic 130 is configured to check (e.g., by reading) a data field of a data structure associated with the group of predecessor task structures. The data field is configured to record and store data indicating whether the temporal criterion has been met, in accordance with one embodiment.

Also, forming the temporally dependent relationship configures the computerized project plan to allow the status of the temporal event to be modified when the checking confirms that the temporal criterion is recorded as being met for the defined number of predecessor task structures. For example, in accordance with one embodiment, when the data in the data field indicates to task association logic 130 that the temporal criterion has been met, task association logic 130 is configured to "unlock" the successor task structure within the computerized project plan such that data fields of the successor task structure can be edited. Once unlocked, the user may edit an appropriate data field of the successor task structure, via user interface logic 120, to change the status of the temporal event. For example, a user may edit the appropriate data field to change the status of the temporal event from "successor task not started" to "successor task started".

In accordance with one embodiment, block 320 is performed by task association logic 130 of the project management logic 110. Furthermore, in one embodiment, the first defined number (cardinality) may be initially set and later changed by cardinality logic 135 of the project management logic 110, in response to user interaction with the graphical user interface. Cardinality logic 135 communicates the defined number to task association logic 130. The graphical user interface is provided by the user interface logic 120 of the project management logic 110, in accordance with one embodiment.

At block 330, a second group of predecessor task structures is generated within the computerized project plan. Each predecessor task structure in the second group represents another predecessor task of the project. In one embodiment, block 330 is performed by task generation logic 125 of the project management logic 110 in response to user interaction with the graphical user interface provided by user interface logic 120. Continuing with the example scenario, each predecessor task of the second group may correspond to a different structural team working on developing a same connecting frame to secure the cryogenic engine to the spaceship. The successor task still corresponds to integrating the cryogenic engine into the spaceship using one of the connecting frames from one of the structural teams (e.g., the first structural team to successfully develop the connecting structure).

At block 340, in response to user interaction with the graphical user interface, a second temporally dependent relationship is formed between the successor task structure and the second group within the computerized project plan. The nature of the second temporally dependent relationship is such that the temporal event associated with the successor task structure (e.g., starting the successor task or finishing the successor task) is allowed to be recorded as having occurred within the computerized project plan only after second temporal criteria (e.g., beginning predecessor tasks of the second group or completing predecessor tasks of the second group) is recorded as having been met within the computerized project plan.

The second temporal criteria have to be recorded as being met for a second defined number of predecessor task structures in the second group before the temporal event can be recorded as having occurred. Furthermore, for the second temporally dependent relationship to be an either-or dependency, the second defined number has to be less than a second total number of predecessor task structures in the second group. For example, the number of predecessor tasks associated with the second group may be four (4) and the second defined number may be one (1). That is, with respect to the example scenario, only one of four structural teams has to successfully develop the connecting frame before integration of the engine into the spaceship can start.

In accordance with one embodiment, block 340 is performed by task association logic 130 of the project management logic 110. Furthermore, in one embodiment, the second defined number (cardinality) may be initially set (and later changed, if desired) by cardinality logic 135 of the project management logic 110, in response to user interaction with the graphical user interface. However, with respect to the example scenario, only one of the engineering teams (cardinality=1) has to successfully develop the cryogenic engine and only one of the structural teams (cardinality=1) has to successfully develop the connecting frame before integration of the cryogenic engine into the spaceship can start.

Furthermore, once one cryogenic engine and one connecting frame are successfully developed, there may be no reason for the other remaining teams to continue work on their cryogenic engines and connecting frames. In accordance with one embodiment, an indication (e.g., to color the associated task structure black) may be made within a data structure of the computerized project plan to indicate to stop work for one or more of the other remaining engineering teams. Similarly, another indication may be made within a data structure of the computerized project plan to indicate to stop work for one or more of the other remaining structural teams. In accordance with one embodiment, mode logic 140 of program management logic 110 is configured to make the indications to task association logic 130 via the data structures. The number of remaining teams to stop work may be configured within the mode logic 140 in response to user interaction with the graphical user interface.

In one embodiment, within a computerized project plan, a temporally dependent relationship can be changed from an either-or dependency to an absolute or global dependency. An absolute or global dependency allows the temporal event of the successor task structure to be recorded within the computerized project plan as having occurred only after the temporal criterion is recorded within the computerized project plan as having been met for each predecessor task structure in the associated group of predecessor task structures. In one embodiment, an either-or dependency can be changed to a global dependency by changing the defined number (cardinality) to a number that matches the total number of predecessor tasks in the group.

In this manner, either-or dependencies may be created between two or more groups of predecessor tasks and a same successor task. Such either-or dependencies may be appropriate for high risk tasks in the fields of, for example, research or exploration.

Figure 4:
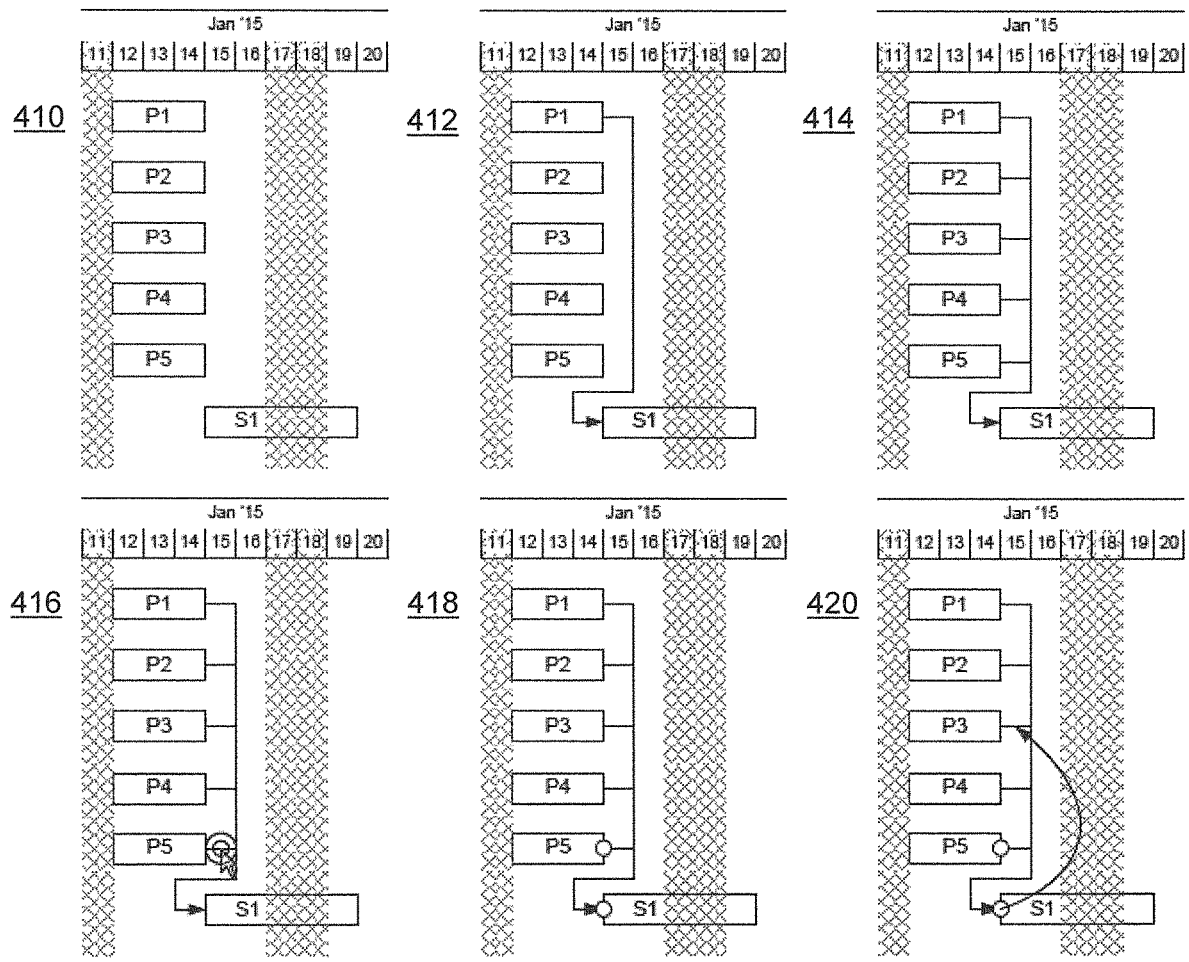
FIGS. 4-6 illustrate example diagrams showing a portion of a Gantt chart within a computerized project plan as it is manipulated using the computer system of FIG. 1 to establish temporally dependent relationships between a plurality of predecessor task structures and a successor task structure.
Figure 5:
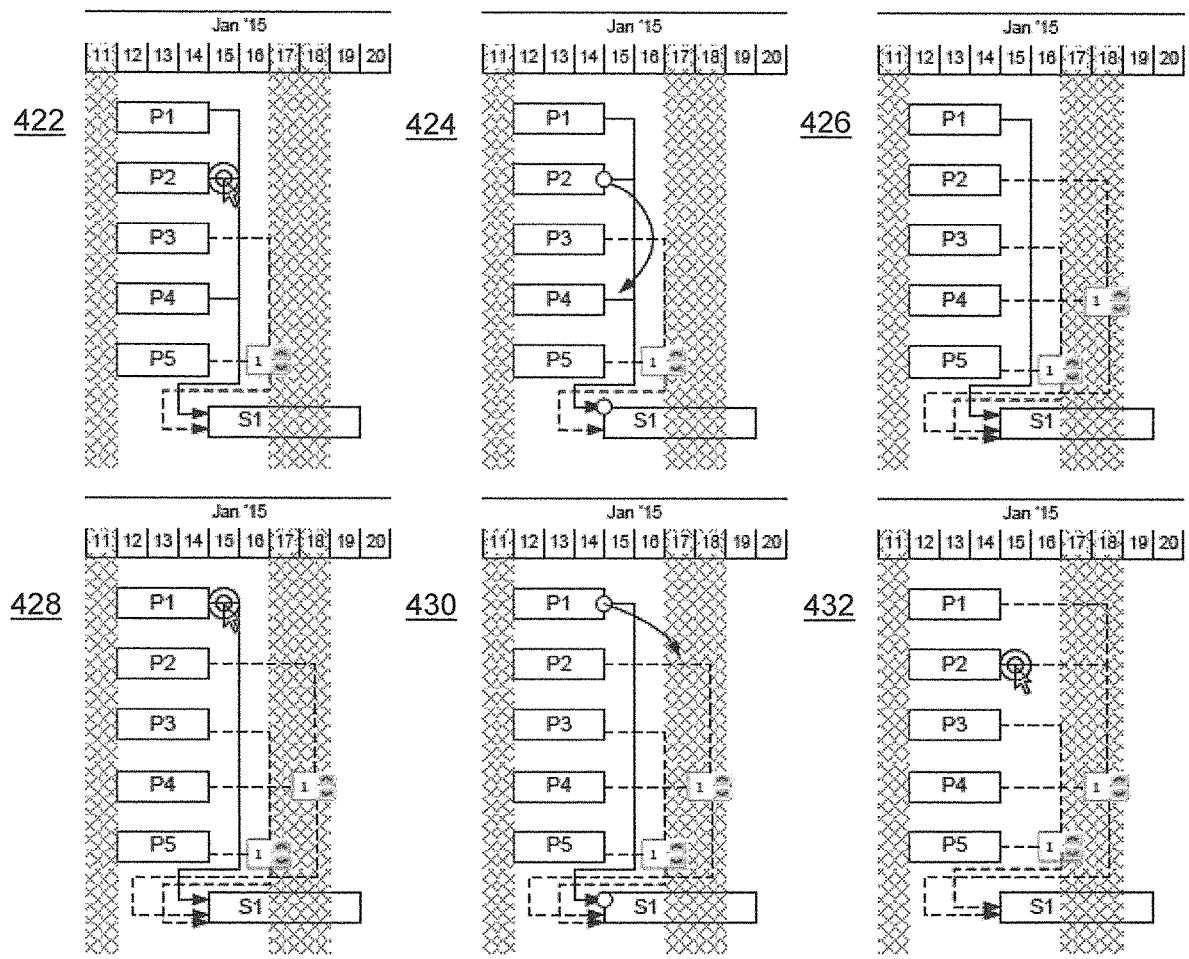
Figure 6:
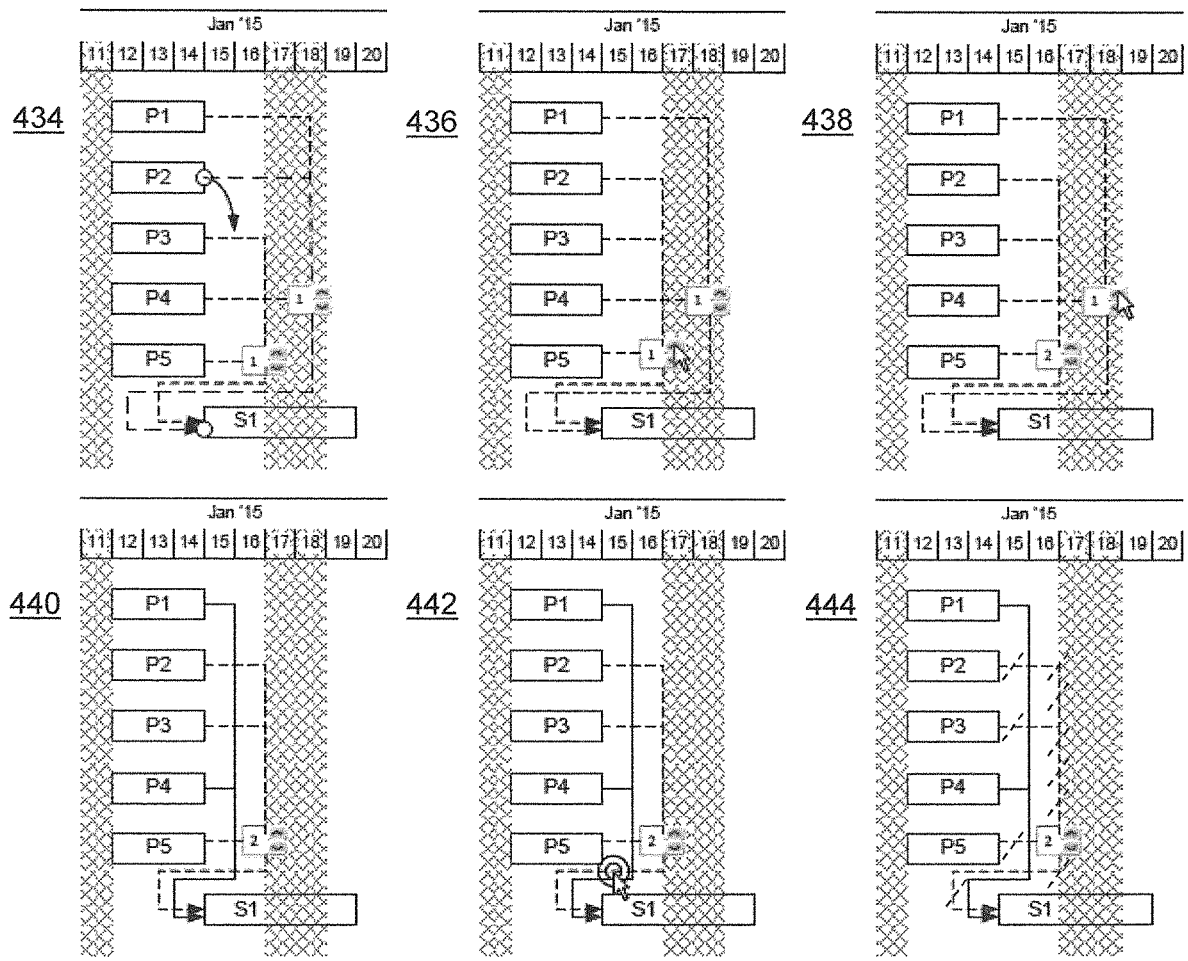

FIGS. 4-6 illustrate example diagrams showing a portion of an embodiment of a Gantt chart within a computerized project plan as it is manipulated by a user, using the computer system 100 of FIG. 1, to establish temporally dependent relationships between a plurality of predecessor task structures and a successor task structure. Diagram 410 shows five (5) predecessor tasks (P1, P2, P3, P4, and P5) and one (1) successor task (S1) represented in a Gantt chart format in a computerized project plan. The tasks and the relationships to be formed between the tasks are internally represented within the computer system as data structures, in accordance with one embodiment.

In diagram 412, P1 and S1 are joined by a finish-to-start dependency depicted as a solid line with an arrow-head from the finish edge of P1 to the start edge of S1. The finish-to-start dependency could be established in other ways as well. For example, the finish-to-start dependency could be established by selecting both P1 and S1 and choosing "connect" using menu options. Alternatively, the finish-to-start dependency could be established by dragging and dropping the finish edge of P1 onto the starting edge of S1. In diagram 414, P2, P3, P4, and P5 are similarly connected to S1 using finish-to-start dependencies. The dependencies shown in diagram 414 are absolute or global dependencies (not either-or dependencies) as represented by the solid lines.

In diagram 416, the user clicks on the predecessor side of the P5-S1 dependency line. In diagram 418, the P5-S1 line gets "selected", which is shown as a thickened line with two drag-handles at both ends. In diagram 420, the S1 side drag-handle is dragged and dropped onto the P3-S1 dependency line. As shown in diagram 422, this creates an either-or dependency group (as indicated by the dashed line) having a cardinality of one (1) between P3, P5, and S1. The cardinality is shown in the group cardinality box across from P5. Notice that this group appears separately from the remaining dependency lines. Next, the user clicks on the predecessor side of the P2-S1 line.

In diagram 424, the user drags and drops the predecessor side drag-handle of the selected P2-S1 line onto the P4-S1 line. As shown in diagram 426, a separate and new either-or dependency group is created between P2, P4, and S1 having a cardinality of one (1). Note that this new either-or dependency group (P2, P4, S1) is shown separately from the other either-or dependency group (P3, P5, S1), and also the global dependency line P1-S1. The only global dependency that remains is between P1 and S1.

Next, as shown in diagram 428, the user clicks on the P1-S1 line to select the same. In diagram 430, the user drags and drops the predecessor side drag-handle of the selected P1-S1 line onto the P2-S1 either-or dependency line. As a result, as shown in diagram 432, P1 also gets added to the P2, P4, S1 either-or dependency group. The user then clicks the P2-S1 either-or dependency line to select the same.

In diagram 434, the user drags and drops the predecessor side drag-handle of the selected P2-S1 either-or dependency line onto the P3-S1 dependency line. This results in, as shown in diagram 436, the P1-S1 dependency leaving the P1, P2, P4, S1 either-or dependency group and joining the P3, P5, S1 either-or dependency group. The user then attempts to increase the cardinality of the P2, P3, P5, S1 either-or dependency group from one (1) to two (2) using the up button on the spinner control icon adjacent to the group cardinality box.

In diagram 438, the user similarly attempts to increase the cardinality of the P1, P4, S1 either-or dependency group from one (1) to two (2) using the up button on the spinner control icon adjacent to the group cardinality box. As shown in diagram 440, since the total number of predecessor tasks in the P1, P4, S1 either-or dependency group is two (2), the preceding interaction converts both of the either-or dependencies in the P1, P4, S1 either-or dependency group to global dependencies, as indicated by the solid lines.

In diagram 442, the user double-clicks on the successor side of the P2, P3, P5, S1 either-or dependency group line to toggle an either-or dependency mode from the default of "continue-and-finish-all-predecessor-tasks" mode, to the "stop-or-abandon-other-predecessor-tasks" mode. As shown in diagram 444, the change in the either-or dependency mode is visually depicted by changing the dependency line from the default dashed depiction to a dashed/slashed depiction. The default mode indicates to continue any remaining predecessor tasks in the group even though temporal criteria have been met for the group, as discussed previously herein. The other mode indicates to discontinue any remaining predecessor tasks in the group when the temporal criteria have been met for the group, as discussed previously herein.

In this manner, a user (e.g., a project manager) can interact with a graphical user interface and manipulate the temporally dependent relationships between predecessor tasks and successor tasks represented in a computerized project plan. FIGS. 4-6 show only some example embodiments of manipulations that can be performed. Other manipulations are possible as well.

FIG. 7 illustrates one embodiment of a data structure 700 within a computerized project plan that associates two groups of predecessor task structures with a successor task structure in a temporally dependent manner. The data structure 700 is configured as a dependency group mapping table and reflects the either-or dependencies shown in diagram 438 of FIG. 6. Predecessor task structures P1 and P4 are identified in the data structure 700 as belonging to the same first group (Group 1) by a group identifier (Group 1 ID). Similarly, predecessor task structures P2, P3, and P5 are identified in the data structure 700 as belonging to another group (Group 2) by another group identifier (Group 2 ID).

Furthermore, the data structure 700 associates each predecessor task structure (P1-P5) as having a temporally dependent relationship with the successor task structure S1. In particular, a first either-or dependency exists between Group 1 (P1, P4) and S1, and a second either-or dependency exists between Group 2 (P2, P3, P5) and S1.

Figure 8:
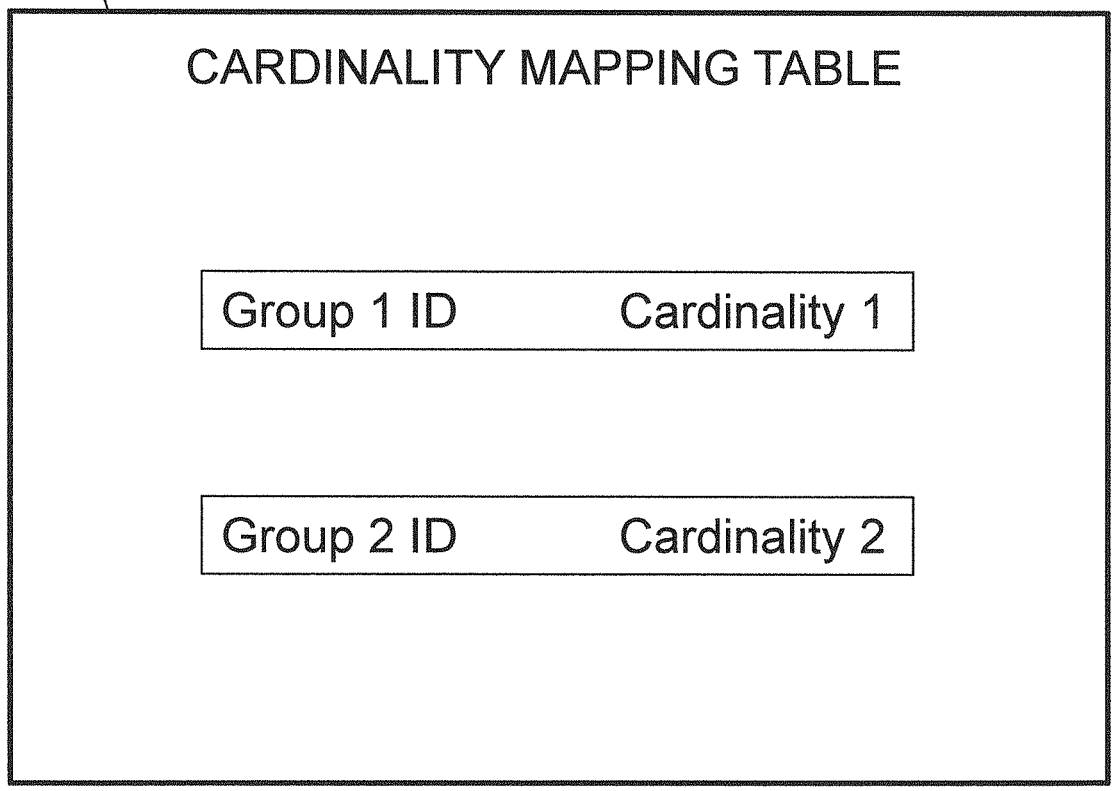
FIG. 8 illustrates one embodiment of a data structure within a computerized project plan that associates the two groups of predecessor task structures of FIG. 7 with a cardinality value.

FIG. 8 illustrates one embodiment of a data structure 800 within a computerized project plan that associates each of the two groups of predecessor task structures of FIG. 7 with a cardinality value. The data structure 700 is configured as a cardinality mapping table. For example, as shown in the data structure 800, Group 1 (P1, P4) has a cardinality of one (1). That is, a temporal criterion has to be met for any one (1) of P1 or P4 before a temporal event of S1 can be recorded as having occurred. Similarly, Group 2 (P2, P3, P5) has a cardinality of two (2). That is, a temporal criterion has to be met for any two (2) of P2, P3, or P5 before the temporal event of S1 can be recorded as having occurred.

Referring back to the spaceship example, P1 and P4 may correspond to the predecessor tasks of developing a cryogenic engine by two engineering teams. P2, P3, and P5 may correspond to the predecessor tasks of developing a connecting frame by three structural teams. S1 may correspond to the successor task of integrating the cryogenic engine into the spaceship using the connecting frame by an integration team.

In this manner, groups of temporally dependent relationships between predecessor tasks and successor tasks can be established and represented within a computerized project plan via data structures. Other mapping table type data structures are possible as well, in accordance with other embodiments. For example, in one embodiment, the cardinality mapping table 800 can be integrated into the dependency group mapping table 700 to form a single table. Even though FIG. 7 and FIG. 8 represent mapping table type data structures, other types of data structures are possible as well, in accordance with various other embodiments (e.g., pointers or linked lists).

Systems, methods, and other embodiments have been described that are configured to establish either-or dependent relationships between task structures representing tasks within a computerized project plan. In one embodiment, task association logic is configured to, in response to user interaction with a graphical user interface, form a temporally dependent relationship between a successor task structure and a group of predecessor task structures within the computerized project plan. The temporally dependent relationship allows a temporal event associated with the successor task structure to be recorded within the computerized project plan as having occurred only after a temporal criterion is recorded within the computerized project plan as having been met for a defined number of predecessor task structures in the group. The defined number is less than a total number of predecessor task structures in the group.

Computing Device Embodiment

Figure 9:
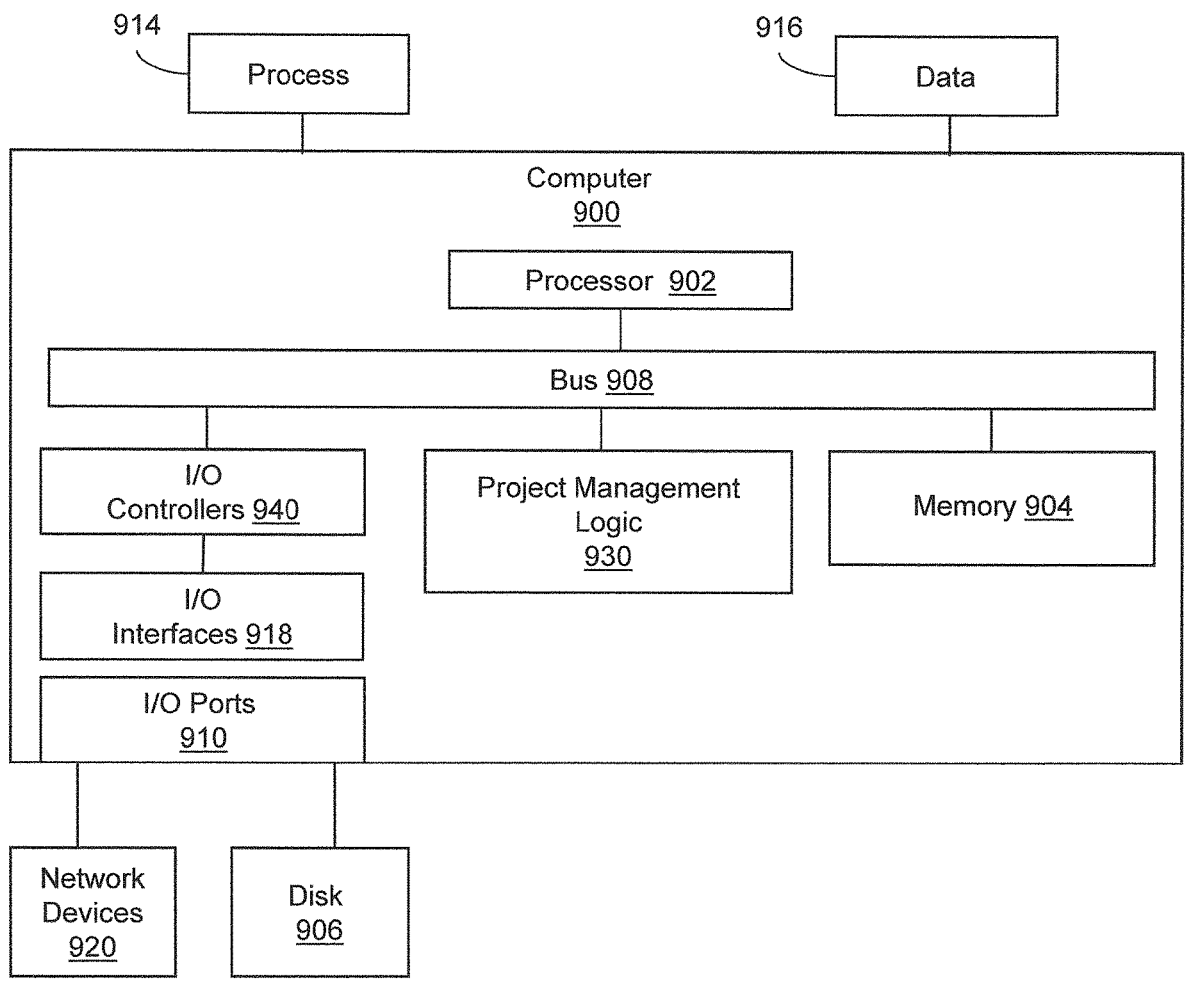
FIG. 9 illustrates one embodiment of a computing device upon which a project management logic of a computing system may be implemented.

FIG. 9 illustrates an example computing device that is configured and/or programmed with one or more of the example systems and methods described herein, and/or equivalents. FIG. 9 illustrates one example embodiment of a computing device upon which an embodiment of a project management logic may be implemented. The example computing device may be a computer 900 that includes a processor 902, a memory 904, and input/output ports 910 operably connected by a bus 908.

In one example, the computer 900 may include project management logic 930 (corresponding to project management logic 110 from FIG. 1) configured with a programmed algorithm as disclosed herein to establish temporally dependent either-or relationships between predecessor task structures and successor task structures in a computerized project plan. In different examples, the logic 930 may be implemented in hardware, a non-transitory computer-readable medium with stored instructions, firmware, and/or combinations thereof. While the logic 930 is illustrated as a hardware component attached to the bus 908, it is to be appreciated that in other embodiments, the logic 930 could be implemented in the processor 902, a module stored in memory 904, or a module stored in disk 906.

In one embodiment, logic 930 or the computer 900 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the establishment of temporally dependent either-or relationships between task structures within a computerized project plan. The means may also be implemented as stored computer executable instructions that are presented to computer 900 as data 916 that are temporarily stored in memory 904 and then executed by processor 902.

Logic 930 may also provide means (e.g., hardware, non-transitory computer-readable medium that stores executable instructions, firmware) for facilitating the establishment of temporally dependent either-or relationships between task structures within a computerized project plan.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method comprising:
generating a successor task structure and a first group of predecessor task structures within a computerized project plan, wherein (i) the successor task structure and predecessor task structures are stored as data structures in a database, (ii) the successor task structure represents a successor task of a project, (iii) each predecessor task structure in the first group represents a predecessor task of the project, and (iv) the predecessor tasks represented by the first group are alternative predecessors to the successor task;
automatically depicting the successor task structure and the first group in a graphical user interface associated with the computerized project plan;
in response to user interaction with the depictions of the successor task structure and the first group in the graphical user interface:
  (a) forming a temporally dependent relationship between the successor task structure and the first group within the computerized project plan in response to at least one drag and drop operation performed, wherein the temporally dependent relationship is formed at least in part by mapping first data associated with the successor task structure to second data associated with the first group within the computerized project plan, and wherein the temporally dependent relationship specifies that a status of a temporal event of the successor task is locked to prevent modification unless a temporal criterion is met by at least a defined number of any of the predecessor tasks within the first group,
  (b) designating the temporal event as starting the successor task or finishing the successor task,
  (c) designating the temporal criterion as beginning the predecessor task or completing the predecessor task,
  (d) automatically generating a dependency data structure in the database that represents the temporally dependent relationship, and
  (e) automatically depicting the temporally dependent relationship in the graphical user interface, and
in response to user interaction with the depiction of the temporally dependent relationship in the graphical user interface, change the defined number of the predecessor tasks for which the temporal criterion must be met,
wherein the temporally dependent relationship configures the computerized project plan for:
  (i) automatically detecting an attempt to modify the status of the temporal event associated with the successor task structure,
  (ii) automatically checking whether the temporal criterion is recorded within the computerized project plan as being met for the defined number of the predecessor tasks in response to the detecting, wherein the defined number of the predecessor tasks is less than a total number of predecessor task structures in the first group, and
  (iii) automatically unlocking the status of the temporal event to allow the status to be modified when the checking confirms that the temporal criterion is recorded as being met for at least the defined number of the predecessor tasks.

2. The method of claim 1, further comprising:
changing the defined number of the predecessor tasks in response to the user interaction with the graphical user interface;
in response to the user interaction with the graphical user interface, changing the temporally dependent relationship between the successor task structure and the first group by allowing the temporal event of the successor task structure to be recorded within the computerized project plan as having occurred only after the temporal criterion is recorded within the computerized project plan as having been met for each predecessor task structure in the first group;
indicating within a data structure of the computerized project plan to stop work for at least one uncompleted predecessor task associated with the first group when the temporal criterion for the defined number of the predecessor tasks is recorded as being met within the computerized project plan;
generating a second group of predecessor task structures within the computerized project plan, wherein each predecessor task structure in the second group represents another predecessor task of the project;
in response to the user interaction with the graphical user interface, forming a second temporally dependent relationship between the successor task structure and the second group within the computerized project plan, wherein the second temporally dependent relationship configures the computerized project plan for:
  (i) detecting the attempt to modify the status of the temporal event associated with the successor task structure,
  (ii) checking whether a second temporal criterion is recorded within the computerized project plan as being met for a second defined number of any of the predecessor tasks in the second group in response to the detecting, wherein the second defined number of the predecessor tasks is less than a second total number of predecessor task structures in the second group, and
  (iii) allowing the status of the temporal event to be modified when the checking confirms that the second temporal criterion is recorded as being met for the second defined number of the predecessor tasks.

3. The method of claim 1, further comprising indicating within a data structure of the computerized project plan to stop work for at least one uncompleted predecessor task associated with the first group when the temporal criterion for the defined number of the predecessor tasks is recorded as being met within the computerized project plan.

4. The method of claim 1, further comprising:
generating a second group of predecessor task structures within the computerized project plan, wherein each predecessor task structure in the second group represents another predecessor task of the project; and
in response to the user interaction with the graphical user interface, forming a second temporally dependent relationship between the successor task structure and the second group within the computerized project plan,
wherein the second temporally dependent relationship configures the computerized project plan for:
(i) detecting the attempt to modify the status of the temporal event associated with the successor task structure,
(ii) checking whether a second temporal criterion is recorded within the computerized project plan as being met for a second defined number of any of the predecessor tasks in the second group in response to the detecting, wherein the second defined number of the predecessor tasks is less than a second total number of predecessor task structures in the second group, and
(iii) allowing the status of the temporal event to be modified when the checking confirms that the second temporal criterion is recorded as being met for the second defined number of the predecessor tasks.

5. The method of claim 1, further comprising, in response to the user interaction with the graphical user interface, changing the temporally dependent relationship between the successor task structure and the first group by allowing the temporal event of the successor task structure to be recorded within the computerized project plan as having occurred only after the temporal criterion is recorded within the computerized project plan as having been met for each predecessor task structure in the first group.

6. The method of claim 1, wherein the depiction of the temporally dependent relationship in the graphical user interface includes a line with an arrow-head between the depiction of the successor task structure and one or more of the of the depictions of the predecessor task structures.

7. The method of claim 1, wherein the defined number may be changed by user interaction with a control presented in response to user interaction with the line in the graphical user interface.

8. The method of claim 1, wherein the temporally dependent relationship is automatically formed in response to at least one drag and drop operation performed between an edge of the depiction of the successor task structure and an edge of the depiction of a predecessor task structure to cause a line with an arrow-head representing the temporally dependent relationship to be depicted between the successor task structure edge and the predecessor task structure edge, wherein the location of the edges on the depiction of the successor task indicate a value of the temporal event, and the location of the edges on the depiction of the predecessor task indicate a value of the temporal criterion.

9. The method of claim 1, automatically changing the color of a first subset of the predecessor tasks in response to a detection that a temporal event has been satisfied for a second subset of the predecessor tasks.

10. A computing system, comprising:
a user interface module, including instructions stored in a non-transitory computer-readable medium, configured to provide a graphical user interface associated with a computerized project plan;
a task generation module, including instructions stored in the non-transitory computer-readable medium, configured to generate a successor task structure and a first group of predecessor task structures within the computerized project plan in response to user interaction with the graphical user interface, wherein (i) the successor task structure and predecessor task structures are stored as data structures in a database, (ii) the successor task structure represents a successor task of a project, (iii) each predecessor task structure in the first group represents a predecessor task of the project, (iv) the predecessor tasks represented by the first group are alternative predecessors to the successor task, (v) the user interface module is configured to automatically depict the successor task structure and the first group in the graphical user interface;
a task association module, including instructions stored in the non-transitory computer-readable medium, configured to, in response to user interaction with the depictions of the successor task structure and the first group in the graphical user interface:
(a) form a temporally dependent relationship between the successor task structure and the first group within the computerized project plan in response to at least one drag and drop operation performed, wherein the temporally dependent relationship is formed at least in part by mapping first data associated with the successor task structure to second data associated with the first group within the computerized project plan, and wherein the temporally dependent relationship specifies that a status of a temporal event of the successor task is locked to prevent modification unless a temporal criterion is met by at least a defined number of any of the predecessor tasks within the first group,
(b) designate the temporal event as starting the successor task or finishing the successor task,
(c) designate the temporal criterion as beginning the predecessor task or completing the predecessor task,
(d) automatically generate a dependency data structure in the database that represents the temporally dependent relationship, wherein the user interface module is configured to automatically depict the temporally dependent relationship in the graphical user interface, and
(e) allow a temporal event associated with the successor task structure to be recorded within the computerized project plan as having occurred only after a temporal criterion is recorded within the computerized project plan as having been met for at least a defined number of the predecessor tasks in the first group, and
a cardinality module, including instructions stored in a non-transitory computer-readable medium, configured to, in response to user interaction with the depiction of the temporally dependent relationship in the graphical user interface,
(i) change the defined number of the predecessor tasks in response to the user interaction with the graphical user interface, and (ii) communicate the defined number of the predecessor tasks to the task association module;

wherein the temporally dependent relationship configures the computerized project plan for automatically unlocking the status of the temporal event to allow the status to be modified upon automatic confirmation that the temporal criterion is met by at least the defined number of the predecessor tasks.

11. The computing system of claim 10, further comprising a mode module, including instructions stored in a non-transitory computer-readable medium, configured to indicate to the task association module that work is to be stopped for at least one uncompleted predecessor task associated with the first group when the temporal criterion for the defined number of the predecessor tasks is recorded as being met within the task association module.

12. The computing system of claim 10, wherein the task association module is configured to form the temporally dependent relationship at least in part by mapping first data associated with the successor task structure to second data associated with the first group via at least one data structure.

13. The computing system of claim 10, wherein:
the task generation module is configured to generate a second group of predecessor task structures within the computerized project plan, wherein each predecessor task structure in the second group represents another predecessor task of the project; and
the task association module is configured to, in response to the user interaction with the graphical user interface, form a second temporally dependent relationship between the successor task structure and the second group within the computerized project plan by allowing the temporal event associated with the successor task structure to be recorded within the computerized project plan as having occurred only after a second temporal criterion is recorded within the computerized project plan as having been met for a second defined number of the predecessor tasks in the second group, wherein the second defined number of the predecessor tasks is less than a second total number of predecessor task structures in the second group.

14. The computing system of claim 13, wherein the task association module is configured to, in response to the user interaction with the graphical user interface, change the temporally dependent relationship between the successor task structure and the first group by allowing the temporal event of the successor task structure to be recorded within the computerized project plan as having occurred only after the temporal criterion is recorded within the computerized project plan as having been met for each predecessor task structure in the second group.

15. A non-transitory computer-readable medium storing computer-executable instructions that are part of an algorithm that, when executed by a computer, cause the computer to perform functions, wherein the instructions comprise:
instructions configured for generating a successor task structure and a first group of predecessor task structures within a computerized project plan, wherein (i) the successor task structure and predecessor task structures are stored as data structures in a database, (ii) the successor task structure represents a successor task of a project, (iii) each predecessor task structure in the first group represents a predecessor task of the project, and (iv) the predecessor tasks represented by the first group are alternative predecessors to the successor task;
instructions configured for automatically depicting the successor task structure and the first group in a graphical user interface associated with the computerized project plan;
instructions configured for, in response to user interaction with the depictions of the successor task structure and the first group in the graphical user interface:
  (a) forming a temporally dependent relationship between the successor task structure and the first group within the computerized project plan in response to at least one drag and drop operation performed, wherein the temporally dependent relationship is formed at least in part by mapping first data associated with the successor task structure to second data associated with the first group within the computerized project plan,
  (b) designating the temporal event as starting the successor task or finishing the successor task,
  (c) designating the temporal criterion as beginning the predecessor task or completing the predecessor task,
  (d) automatically generating a dependency data structure in the database that represents the temporally dependent relationship, wherein the temporally dependent relationship is automatically depicted in the graphical user interface, and
  (e) allowing a temporal event associated with the successor task structure to be recorded within the computerized project plan as having occurred only after a temporal criterion is recorded within the computerized project plan as having been met for at least a defined number of the predecessor tasks in the first group, wherein the defined number of the predecessor tasks is less than a total number of predecessor task structures in the first group, wherein the temporally dependent relationship specifies that a status of the temporal event of the successor task is locked to prevent modification or unlocked to allow modification based on checking whether the temporal criterion is met by at least the defined number of any of the predecessor tasks within the first group; and
instructions configured for, in response to user interaction with the depiction of the temporally dependent relationship in the graphical user interface, changing the defined number of the predecessor tasks in response to the user interaction with the graphical user interface.

16. The non-transitory computer-readable medium of claim 15, wherein the instructions further include instructions configured for indicating within a data structure of the computerized project plan to stop work for at least one uncompleted predecessor task associated with the first group when the temporal criterion for the defined number of the predecessor tasks is recorded as being met within the computerized project plan.

17. The non-transitory computer-readable medium of claim 15, wherein the instructions further include:
instructions configured for generating a second group of predecessor task structures within the computerized project plan, wherein each predecessor task structure in the second group represents another predecessor task of the project; and
instructions configured for, in response to the user interaction with the graphical user interface, forming a second temporally dependent relationship between the successor task structure and the second group within the computerized project plan by allowing the temporal event associated with the successor task structure to be recorded within the computerized project plan as having occurred only after a second temporal criterion is recorded within the computerized project plan as having been met for a second defined number of the predecessor tasks in the second group, wherein the second defined number of the predecessor tasks is less than a second total number of predecessor task structures in the second group.

* * * * *

UNITED STATES PATENT AND TRADEMARK OFFICE
CERTIFICATE OF CORRECTION

PATENT NO.        : 11,093,878 B2  
APPLICATION NO.   : 14/788834  
DATED             : August 17, 2021  
INVENTOR(S)       : De et al.

Page 1 of 1

It is certified that error appears in the above-identified patent and that said Letters Patent is hereby corrected as shown below:

On the Title Page

Column 1, item (73) Assignee, Line 2, delete "Shores (CA)" and insert -- Shores, CA (US) --, therefor.

In the Specification

In Column 1, Line 9, delete ""hard`"" and insert -- "hard" --, therefor.

In the Claims

In Column 21, Lines 46-47, in Claim 6, delete "of the of the" and insert -- of the --, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*